(12) United States Patent
Chen et al.

(10) Patent No.: US 9,785,989 B2
(45) Date of Patent: Oct. 10, 2017

(54) DETERMINING A CHARACTERISTIC GROUP

(71) Applicant: Alibaba Group Holding Limited, George Town (KY)

(72) Inventors: Zhiqiang Chen, Hangzhou (CN); Haijie Gu, Hangzhou (CN); Jidong Shao, Hangzhou (CN); Guli Lin, Hangzhou (CN); Shui Liu, Hangzhou (CN)

(73) Assignee: Alibaba Group Holding Limited, Cayman Islands (KY)

( * ) Notice: Subject to any disclaimer, the term of this patent is extended or adjusted under 35 U.S.C. 154(b) by 713 days.

(21) Appl. No.: 14/056,867

(22) Filed: Oct. 17, 2013

(65) Prior Publication Data
US 2014/0122294 A1  May 1, 2014

(30) Foreign Application Priority Data
Oct. 23, 2012 (CN) .......................... 2012 1 0407962

(51) Int. Cl.
*G06Q 30/00* (2012.01)
*G06Q 30/06* (2012.01)

(52) U.S. Cl.
CPC ................ *G06Q 30/0609* (2013.01)

(58) Field of Classification Search
None
See application file for complete search history.

(56) References Cited

U.S. PATENT DOCUMENTS

| 7,562,814 B1 | 7/2009 | Shao et al. |
| 7,793,835 B1 | 9/2010 | Coggeshall et al. |
| 8,458,090 B1 | 6/2013 | Batra et al. |
| 2006/0149674 A1* | 7/2006 | Cook ............... G06Q 20/40 705/44 |

OTHER PUBLICATIONS

Raghavan et al., "Near Linear Time Algorithm to Detect Community Structures in Large-Scale Networks", Sep. 19, 2007, pp. 1-12.

* cited by examiner

*Primary Examiner* — Shay S Glass
(74) *Attorney, Agent, or Firm* — Van Pelt, Yi & James LLP

(57) ABSTRACT

Determining a characteristic group is disclosed, including: retrieving stored mapping relationship data for first objects and second objects, wherein the mapping relationship data describes connections between the first objects and the second objects; determining a candidate group including at least some of the first objects and at least some of the second objects based at least in part on the mapping relationship data, wherein any first object included in the candidate group is associated with another first object included in the candidate group via one or more other first object(s) or second object(s) included in the candidate group; determining a first characteristic value associated with the candidate group based at least in part on a number of first objects that are included in the candidate group; and determining whether the candidate group comprises a characteristic group based at least in part on the first characteristic value.

23 Claims, 12 Drawing Sheets

DETERMINING A CHARACTERISTIC GROUP

CROSS REFERENCE TO OTHER APPLICATIONS

This application claims priority to People's Republic of China Patent Application No. 201210407962.X entitled A CHARACTERISTIC GROUP RECOGNITION METHOD AND DEVICE AND A SEARCH METHOD AND DEVICE, filed Oct. 23, 2012 which is incorporated herein by reference for all purposes.

FIELD OF THE INVENTION

The present application involves the field of transaction information processing. In particular, the present application describes techniques for determining characteristic groups.

BACKGROUND OF THE INVENTION

Many websites on the internet allow users to register user accounts. Some websites may have hundreds of millions of registered users.

Presently, some seller users on certain shopping websites, in order to promote their own merchandise on the websites, register several useless accounts either manually or using automated techniques. These falsely registered accounts on a website are often used to commit fraud or other activities that are detrimental to the normal operation of the website, and thus are also referred to as maliciously registered accounts. For example, if maliciously registered accounts are used to purchase a certain product, false sales records are generated, which may artificially drive up the sales of the product and deceive consumers into thinking that the product is more desirable than it actually is.

Conventionally, malicious registrations can be curbed using either pre-registration prevention or post-registration processing. Pre-registration prevention is generally accomplished by adding a verification code input step during the website user registration process. To a certain extent, this technique is able to prevent automated programs from registering false accounts. Post-registration processing targets maliciously registered accounts which have already been generated when pre-registration prevention has been ineffective. For example, post-registration processing may target a particular type of user identifier, such as cookies. If the number of account number logins associated with the same cookie exceeded a predetermined value, then it may be determined that these account numbers associated with the same cookie are maliciously registered account numbers.

However, the conventional techniques described above are associated with some drawbacks. While adding a verification code during the website user registration process may prevent account registration by automated programs, it does not prevent malicious registrations that are generated by large numbers of manual registrations. Determining that multiple account numbers are malicious because they are linked to the same user identifier is only able to discover a minority of maliciously registered accounts because the majority of maliciously registered accounts will not necessarily share a common user identifier. In the cookie example, if the same website user uses an account number at different times on different devices, the associated cookies are very likely to be different and so checking the number of account numbers associated with one cookie is not an effective way to discover abnormal information.

Therefore, it would be desirable to provide a mechanism for the recognition of characteristic groups, where a characteristic group is suspected to be associated with one or more potentially maliciously registered accounts. By identifying characteristic groups, buyer users may be prevented from being deceived and the transaction security of online shopping may be increased.

BRIEF DESCRIPTION OF THE DRAWINGS

Various embodiments of the invention are disclosed in the following detailed description and the accompanying drawings.

DETAILED DESCRIPTION

Figure 1:
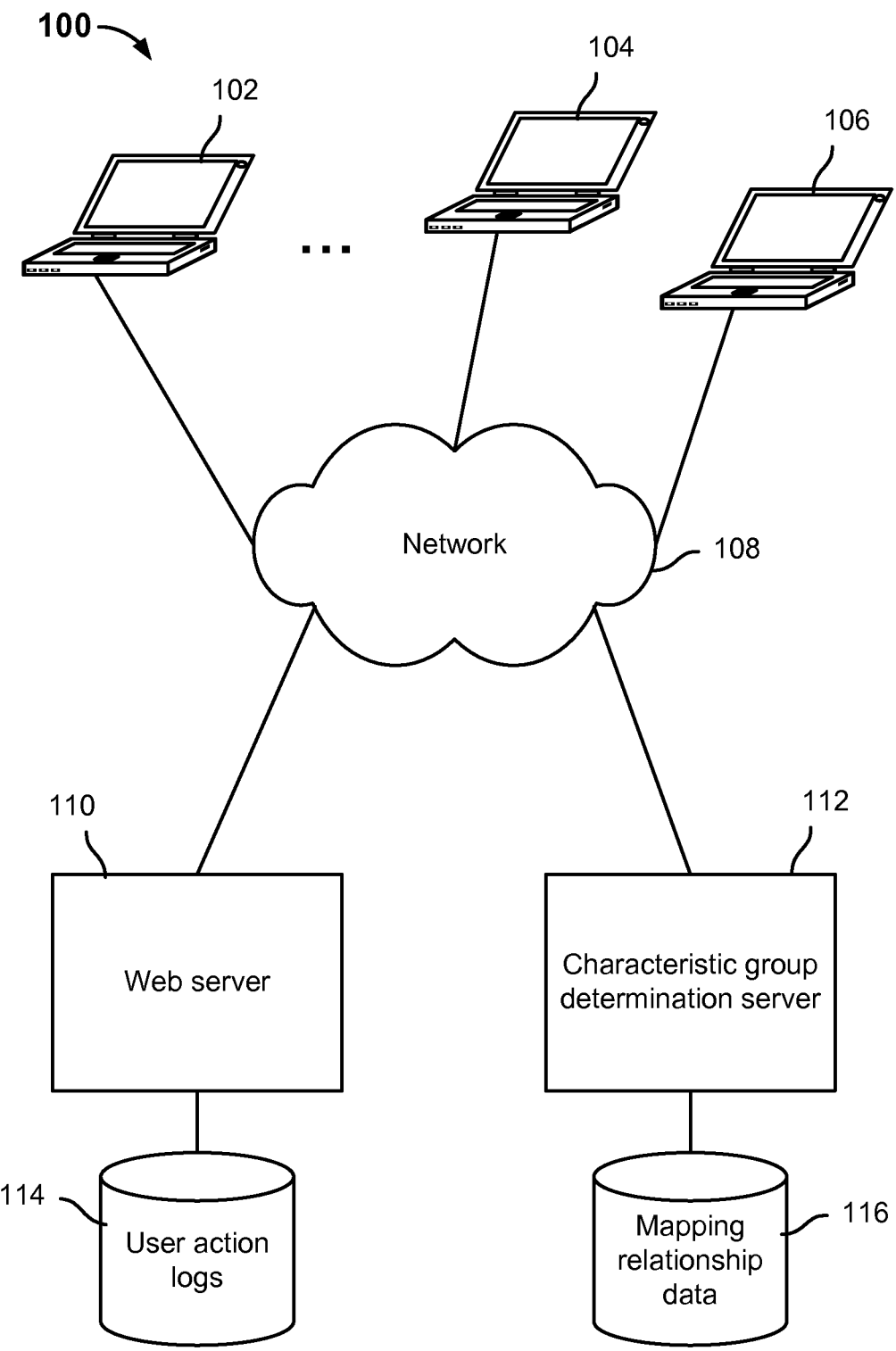
FIG. 1 is a diagram showing an embodiment of a system for determining a characteristic group.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of characteristic group determination are described herein. Stored mapping relationship data is retrieved, wherein the mapping relationship data describes connections between first objects and second objects. In some embodiments, first objects comprise user account numbers associated with a website (e.g., alphanumeric account numbers assigned by the website's server) and second objects comprise user identifiers associated with the website (e.g., cookies or the like used to identify users who access the website). A candidate group of first objects and second objects is determined based at least in part on the mapping relationship data. In the candidate group, any two objects are either directly associated or indirectly associated via one or more other first or second objects of the candidate group. At least one characteristic value is determined for the candidate group and the at least one characteristic value is used to determine whether the candidate group comprises a characteristic group. In various embodiments, a "characteristic group" refers to a candidate group that is suspected to include at least one malicious user account number (a first object).

FIG. 1 is a diagram showing an embodiment of a system for determining a characteristic group. In the example, system 100 includes device 102, device 104, device 106, network 108, web server 110, user action logs 114, characteristic group determination server 112, and mapping relationship data 116. Network 108 includes high-speed data networks and/or telecommunications networks. Device 102, device 104, device 106, web server 110, and characteristic group determination server 112 are configured to communicate with each other via network 108.

Web server 110 is configured to host a website at which user accounts may be registered. For example, to register a user account at the website, a user is required to submit information solicited by the website over a user interface. In various embodiments, a registered user account is associated with a user account number. For example, users using any of devices 102, 104, and 106 may access the website and register one or more user accounts. While each of devices 102, 104, and 106 is shown as a laptop computer, other examples of devices 102, 104, and 106 include desktop computers, smart phones, tablet devices, mobile devices, and/or any computing device.

However, while some users may register user accounts for their actual personal use, some users may register one or more user accounts falsely (e.g., with fake names and other information) and utilize these false accounts to perform deceptive actions at the website. For example, if the website were an e-commerce website, then feedback may be provided through a false user account for a certain product, which may contribute to the overall opinion of the product at the website. However, because the user account is false, the feedback is not genuine and may negatively affect the seller user of the product and/or the potential buyer users of the product. As such, characteristic group determination server 112 is configured to determine a characteristic group, which is a group of user account numbers associated with the website that potentially includes maliciously registered user accounts.

Characteristic group determination server 112 is configured to determine a characteristic group based on mapping relationship data stored at mapping relationship data 116. Mapping relationship data stores the connections between user account numbers (which are also referred to as "first objects") associated with the website and user identifiers (which are also referred to as "second objects") associated with the website. For example, the stored mapping relationship data may be determined based on analyzing user action logs stored at user action logs 114. A user action log stored at user action logs 114 tracks actions at the website by a user (e.g., using devices 102, 104, or 106) who has logged onto the website via a user account number. Each user action log records the logged on user account number and one or more types of user identifiers that were used in connection with the user account number. For example, an email address that is submitted to the website by a user may be determined as a user identifier that is connected with the user account number that was used to log onto the website. Using the mapping relationship data that describes the connections between various first objects and second objects, characteristic group determination server 112 is configured to determine a candidate group of first and second objects. In the candidate group, each (first or second) object is associated with each other (first or second) object via one or more other objects, as will be further explained below. Then the characteristic group determination server 112 is configured to determine whether the candidate group comprises a characteristic group based at least in part on one or more characteristic values associated with the candidate group.

In some embodiments, after a characteristic group is determined, processing may be performed with respect to the user account numbers and/or user identifiers included in the characteristic group. For example, at least some of the user account numbers in a characteristic group may be prevented from performing future actions (e.g., logging in, making purchases, or submitting feedback) at the website.

Figure 2:
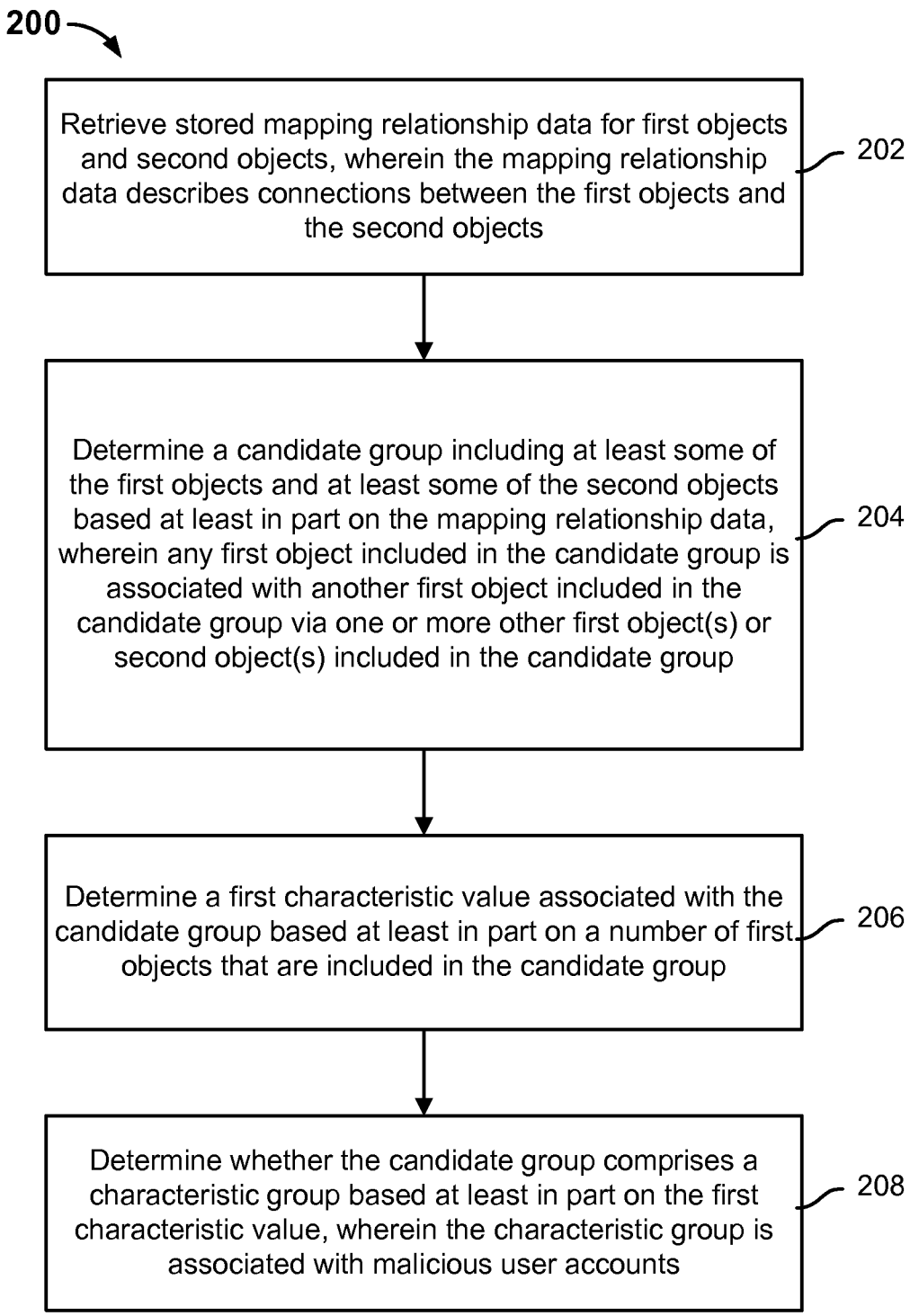
FIG. 2 is a flow diagram showing an embodiment of a process for determining a characteristic group.

FIG. 2 is a flow diagram showing an embodiment of a process for determining a characteristic group. In some embodiments, process 200 is implemented at system 100 of FIG. 1.

At 202, stored mapping relationship data for first objects and second objects is retrieved, wherein the mapping relationship data describes connections between the first objects and the second objects.

In some embodiments, the first objects comprise user account numbers associated with a website. A user account number is associated with a registered account at a website. For example, a registered account may be created by a user or an automated program through submission of the requisite information via a user interface associated with the website. A user or automated program may register one or more user accounts, which correspond to an equal number of user account numbers. In some embodiments, the second objects may be user identifiers. User identifiers comprise any information associated with the account (e.g., such as information associated with the user of the account as the user was browsing the website) and is able to determine user identity. Examples of user identifiers include cookies generated upon login, email addresses and mobile phone numbers tied to the account, a value computed by a defined algorithm using a variety of information, etc. One user account number may correspond to multiple user identifiers and one user identifier may also be used for multiple user account numbers.

The mapping relationship data comprises data that indicates which one or more first objects are connected with each second object and which one or more second objects are connected with each first object. For example, the mapping relationship data may comprise a mapping relationship list for each user account number that indicates all user identifiers connected with it, as well as a mapping relationship list for each user identifier that indicates all user account numbers connected with it. In some embodiments, the mapping relationship data that documents connections between user account numbers and user identifiers may be stored in an initialized database.

In some embodiments, mapping relationship data may be associated with time indications. In some embodiments, mapping relationship data associated with a specified period of time (e.g., three months) is retrieved from the initialized database.

Figure 3:
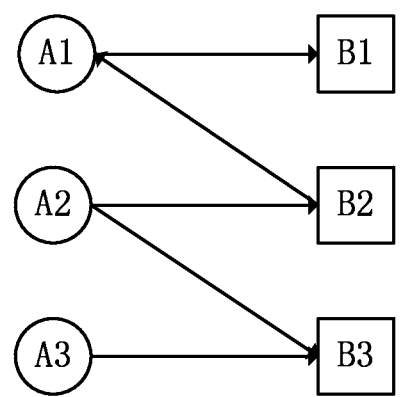
FIG. 3 is a schematic diagram that shows the relationships among several first objects and second objects.

Mapping relationship data may be regarded as the adjacency list that is used to represent a graph in graph theory. FIG. 3 is a schematic diagram that shows the relationships among several first objects and second objects. In the example, A1, A2, and A3 respectively represent three first objects (e.g., user account numbers) and B1, B2, and B3 respectively represent three second objects (e.g., user identifiers). The mapping relationship data shown in the schematic diagram of FIG. 3 may also be expressed as (A1, B1), (A1, B2), (A2, B2), (A2, B3), and (A3, B3), where each pair represents a first object and a second object that are connected with each other in the mapping relationship data.

The graph expressed by an adjacency list has the following characteristics: the vertices in the graph are all either user account numbers or user identifiers, with each edge only connecting to one user account number and one user identifier, indicating the existence of a determined relationship or correspondence between a particular user account number and a particular user identifier.

In some embodiments, mapping relationship data can be obtained by analyzing the website's action logs. For example, logs of the actions of users logged into the website are recorded over time. Each action log includes one or more user account numbers and one or more corresponding user identifiers. The connections between user account numbers and user identifiers can be obtained by analyzing the recorded action logs. For example, when a user with a certain account number logs onto the website, the connection between the user account number and a user identifier (e.g., cookie) can be obtained. Furthermore, while the user account number is stilled logged onto the website and the user associated with the account number supplies his/her own email address (e.g., in a form associated with the website), then the connection between the user account number and the email address can be obtained. After the mapping relationships have been obtained, they can be saved to an initialized database. For example, an account number may be associated with multiple user identifiers (e.g., cookies) when a user logs on with the same account number from different devices. A user identifier (e.g., a cookie) may be associated with multiple account numbers when users with different account numbers log on from the same device.

Returning to FIG. 2, at 204, a candidate group including at least some of the first objects and at least some of the second objects is determined based at least in part on the mapping relationship data, wherein any first object included in the candidate group is associated with another first object included in the candidate group via one or more other first object(s) or second object(s) included in the candidate group.

In some embodiments, a subset of all the first objects and the second objects described by the retrieved mapping relationship data is determined to be included in a candidate group. In various embodiments, in a candidate group of first objects and second objects, there are two possible types of associations between any two objects: any two objects are either "directly associated" by both being connected with the same other first or second object (e.g., the two objects are associated via one other object) or "indirectly associated" through two or more other first objects and/or second objects (e.g., the two objects are associated via these two or more other objects). For example, if two objects (e.g., a first object and a second object, two first objects, or two second objects) are directly associated, then the two objects are both connected to at least one same other object and therefore are associated via this one other object. If the two objects were indirectly associated, then the two objects are not connected to at least one same other object but are associated via two or more other objects (e.g., that are connected). Put another way, in a candidate group, any two first objects are associated via one or more other first objects and/or second objects; any two second objects are associated via one or more other first objects and/or second objects; and any one first object and any one second object are associated via one or more other first objects and/or second objects. In some embodiments, each candidate group is evaluated to determine whether it potentially includes maliciously registered user account numbers, as will be further described below.

Figure 4:
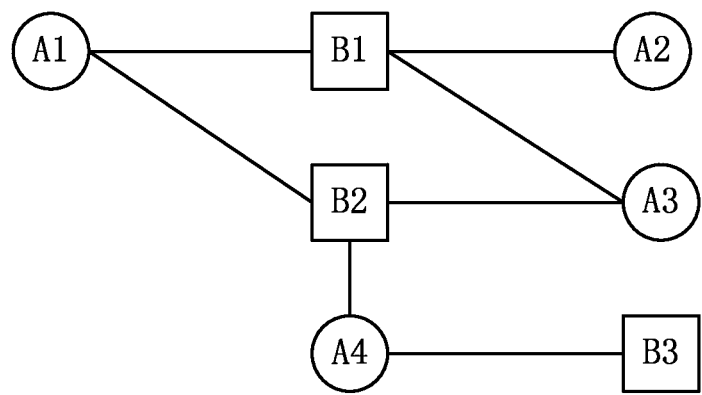
FIG. 4 is a schematic diagram that shows the relationships among several first objects and second objects of a candidate group.

FIG. 4 is a schematic diagram that shows the relationships among several first objects and second objects of a candidate group. In the example, A1, A2, A3, and A4 are first objects (e.g., user account numbers), B1, B2, and B3 are second objects (e.g., user identifiers), and connecting lines between the objects represent the existence of a connection. As shown in FIG. 4, user account number A1 is respectively connected with user identifiers B1 and B2; user identifier B1 is respectively connected with user account numbers A1, A2, and A3; user identifier B2 is respectively connected with user account numbers A1, A3, and A4; and user account number A4 is respectively connected with user identifiers B2 and B3. Moreover, in a candidate group, any one user account number or user identifier can be either directly associated or indirectly associated via one or more user account numbers or user identifiers with any other user account number or user identifier. For example, user account numbers A1 and A2 (which are not connected with each other) are directly associated via user identifier B1, and user account number A1 and user identifier B3 (which are not connected with each other) are indirectly associated via user identifier B2 and user account number A4.

As shown in FIG. 4, in a candidate group, while not all first objects and second objects are connected with each other, any two objects can be directly related via one other object or indirectly related via more than one other object. Determining a candidate group helps to reveal the direct and even indirect associations between any two objects described in the mapping relationship data. Such direct and indirect associations may uncover related user account numbers (or user identifiers) that were not previously thought to be related.

A candidate group may be determined using any manner appropriate such that any two objects in the candidate group are associated via one or more other first objects or second objects included in the same candidate group. Therefore, each candidate group includes user account numbers, each of which is directly associated with another user account number or even indirectly associated with another user account number. As a result, a candidate group as described herein includes user account numbers that are indirectly associated with each other, which could represent potential maliciously registered user accounts that were not previously detected as being potentially malicious. One example of determining a candidate group is described with FIG. 5, below.

Returning to FIG. 2, at 206, a first characteristic value associated with the candidate group is determined based at least in part on a number of first objects that are included in the candidate group. The number of first objects that are included in the candidate group is used as the first characteristic value associated with the candidate group. For example, if there are three first objects that are included in the candidate group, then the first characteristic value of the candidate group is three.

At 208, it is determined whether the candidate group comprises a characteristic group based at least in part on the first characteristic value, wherein the characteristic group is associated with malicious user accounts.

Whether the candidate group comprises a characteristic group is determined based at least in part on its first characteristic value. If a candidate group is determined to be a characteristic group, then the characteristic group is determined to potentially include one or more malicious user accounts. In some embodiments, the first characteristic value of the candidate group is the number of first objects (e.g., user account numbers) that are included in the candidate group. In some embodiments, in the event that the first characteristic value is greater than a first threshold value, then it is determined that the candidate group is a characteristic group. For example, a large number of user account numbers in the group may indicate that at least some of the user account numbers are falsely registered and therefore, the candidate group may comprise a characteristic group. The value of the first threshold value may be predetermined based on the nature and size of the website and specific criteria for malicious registration actions. For example, the value of the first threshold value may be changed over time. In some embodiments, the value assigned to the first threshold value can be from the hundreds to the thousands.

While in the example described above, a candidate group is determined to be a characteristic group based on the first characteristic value, in some other embodiments, such as the example described with FIG. 6 below, a candidate group may be determined to be a characteristic group based on the first characteristic value in combination with one or more other characteristic values.

Figure 5:
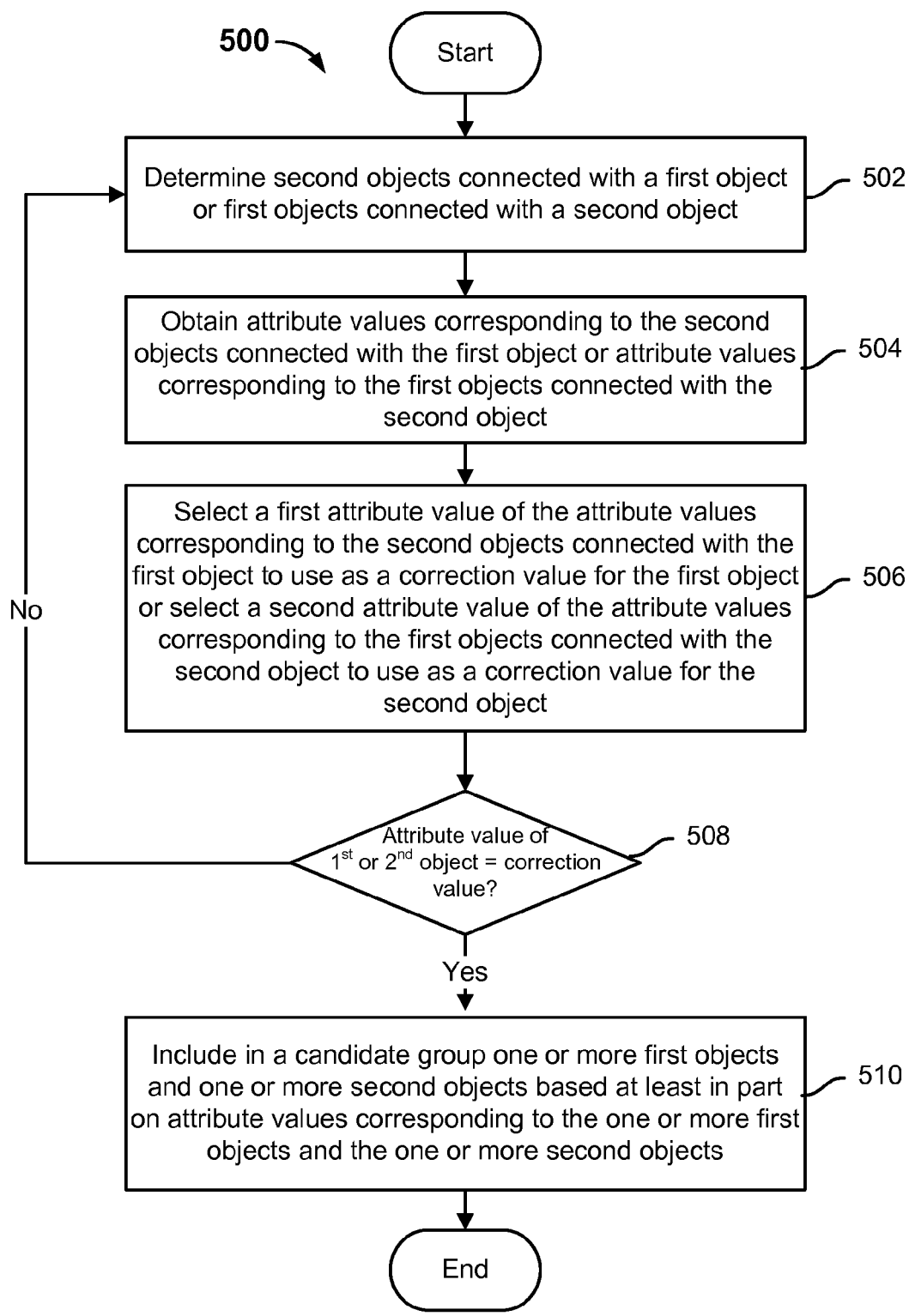
FIG. 5 is a flow diagram showing an embodiment of a process for determining a candidate group.

FIG. 5 is a flow diagram showing an embodiment of a process for determining a candidate group. In some embodiments, process 500 is implemented at system 100 of FIG. 1. In some embodiments, process 500 is used to implement at least a portion of step 204 of process 200 of FIG. 2.

Process 500 shows an example of a process to determine an updated attribute value corresponding to a first object and a second object in a set of first and second objects (e.g., the first and second objects described by the retrieved mapping relationship data) from which one or more candidate groups are to be determined. Process 500 may be performed for each first object and each second object.

At 502, second objects connected with the first object are determined or first objects connected with the second object are determined. In some embodiments, a data structure such as graphs shown in FIG. 3 or FIG. 4 is used to track the objects, connection relationships, and association relationships. For each first object, those second objects that are connected with it are determined. Referring back to the example of FIG. 3, the second objects (e.g., user identifiers) that are connected with first object A1 (e.g., a user account number) include B1 and B2. For each second object, those first objects that are connected with it are determined. Referring back to the example of FIG. 3, the first objects (e.g., user account numbers) that are connected with second object B2 include A1 and A2.

Returning to FIG. 5, at 504, attribute values corresponding to the second objects connected with the first object are obtained or attribute values corresponding to the first objects connected with the second object are obtained.

In various embodiments, each of the first objects and the second objects possesses at least one attribute value. For example, an initial value of the attribute value of a first object may be the user account number ID character string corresponding to the first object. For example, if the name of the first object user account number is "Amy," and the corresponding user account number ID is "12345," then the corresponding attribute value for the first object user account number associated with the name "Amy" is "12345." For example, the initial values of the attribute values of the second objects may be identical to the user identifiers or the user identifier character strings. For example, if the user identifier of a second object is the mobile phone number "2123144155" or the email address "amy@123.com," accordingly, the initial value of the attribute value of the second object can be "2123144155" or "amy@123.com."

Thus, those attribute values corresponding to the second objects connected with each first object are obtained and attribute values corresponding to the first objects connected with each second object are obtained.

At 506, a first attribute value of the attribute values corresponding to the second objects connected with the first object is selected to use as a correction value of the first object or a second attribute value of the attribute values corresponding to the first objects connected with the second object is selected to use as a correction value of the second object. The correction value selected for the first object is used to update the attribute value of the first object and the correction value selected for the second object is used to update the attribute value of the second object.

In some embodiments, the correction value is an attribute value from the attribute values corresponding to the connected second objects for the first object selected based on one or more criteria, or an attribute value from the attribute values corresponding to the connected first objects for the second object selected based on one or more criteria. For example, the smallest attribute value from the attribute values corresponding to the connected second objects for the first object is selected to use as a correction value of the first object and the smallest attribute value from the attribute values corresponding to the connected first objects for the second object is selected to use as a correction value of the second object.

The following is an example technique by which to determine the correction value, which in this case corresponds to the smallest attribute value of the attribute values corresponding to the connected second objects for a first object: The attribute values corresponding to the connected second objects are compared using the lexicographic ordering of character strings. For example, for the two character strings S1 and S2, S1 and S2 are respectively converted into the two byte arrays C1 and C2 using any encoding method (e.g., using UTF8 encoding). The first elements of C1 and C2 are compared. If the first two elements are not equal, the array having the smaller first element comes earlier (before) in the lexicographic order. Otherwise, if the first elements are equal, the second elements of the two arrays are compared. If the second elements are unequal, then the array having the smaller value comes earlier (before) in the lexicographic order. Otherwise, if the second elements are equal, the process continues in this manner. During the process of this traversal, if a certain array has already been traversed because any of its elements are determined to be unequal, then this array comes earlier (before) in the lexicographic order. For example, assume that S1="abc," and S2="123." ASCII encoding may be used to convert S1 and S2 into the respective byte arrays of C1={97,98,99} and C2={49,50,51}. Because the first element of C2 is smaller than that of C1, S2 comes earlier (before) in lexicographic order. The character strings toward the beginning of the lexicographic ordering are smaller character strings, therefore the smallest attribute value can be found by comparing character strings having multiple attribute values.

At 508, it is determined whether an attribute value of the first object corresponds to the correction value for the first object or whether an attribute value of the second object corresponds to the correction value of the second object. In the event that the attribute value of the first object does not correspond to the correction value for the first object, the attribute value for the first object is updated to be the correction value for the first object and control returns to 502 such that 502, 504, and 506 may be repeated for at least each of the first objects whose attribute values did not correspond to their respective correction values. In the event that the attribute value of the first object does correspond to the correction value for the first object, control is transferred to 510. In the event that the attribute value of the second object does not correspond to the correction value for the second object, the attribute value for the second object is updated to comprise the correction value for the second object and control returns to 502 such that 502, 504, and 506 may be repeated for at least each of the second objects whose attribute values did not correspond to their respective correction values. In the event that the attribute value of the second object does correspond to the correction value for the second object, control is transferred to 510.

For example, first object A1 has a corresponding attribute value of a1 (e.g., a1 is the initial attribute value). Based on the mapping relationship data, the connected corresponding second objects to first object A1 are determined to be B1, B2, B3, . . . , Bn. The attribute values b1, b2, b3, . . . , bn corresponding to these second objects are obtained. Then, b1, b2, b3, . . . , bn are compared for size, and the smallest value among them, for example, b2, is selected to use as the correction value for the first object A1. The same technique is used to determine the correction value corresponding to each second object. Then, the attribute values of each first object or second object are compared against their corresponding correction values to determine whether they correspond (e.g., are identical). For example, for first object A1, a determination is made as to whether or not the attribute value of the first object, a1, equals the first object's correction value of b2. If attribute value a1 is different from the correction value of b2, then correction value b2 is used as the updated attribute value a1 of first object A1. Put another way, once it is determined that attribute value a1 of the first object is not the same as the correction value of b2 for the first object, attribute value a1 of the first object is set to equal correction value b2. The same process may be applied to each other first object and each second object. Steps 502 through 508 described above are repeated for each first object and/or each second object until their respective updated attribute value for each first object and second object are identical to their corresponding correction values.

At 510, one or more first objects and one or more second objects are included in a candidate group based at least in part on attributes values corresponding to the one or more first objects and the one or more second objects.

One or more first objects and one or more second objects may be selected to be included in the same candidate group based on the updated attribute values corresponding to the first objects and second objects. For example, the one or more first objects and/or one or more second objects whose updated attribute values are the same are sorted into the same candidate group, regardless of whether the attribute values which are the same are the attribute values of the first objects or the attribute values of the second objects. For example, any second objects that are connected with any first objects that are included in a candidate group are also included in the candidate group. Also, for example, any first objects that are connected with any second objects that are included in a candidate group are also included in the candidate group.

Regarding the adjacency list expressed by the mapping relationship data, in the example where first objects comprise user account numbers and second objects comprise user identifiers, each user account number and each user identifier is a vertex in the corresponding graph. Process 500 as described above for determining a candidate group is an example application of the general graph theory process of label propagation to find connected subgraphs, which is described as follows:

Step 1, one or more vertices connected with a vertex are determined.

Step 2, label values corresponding to the one or more vertices are obtained. For example, a label value may comprise an attribute value of a vertex, such as those described above.

Step 3, if the smallest value among the label values corresponding to the one or more vertices connected to the vertex is different from a current label value of the vertex, then the smallest label value replaces the current label value of the vertex, and control returns to Step 1 and if the smallest value among the label values corresponding to the one or more vertices connected to the vertex is the same as the current label value, then the vertices having the same label are retrieved to serve as connected subgraphs.

The connected subgraphs obtained here are similar to the candidate group as described above. Every two vertices in the connected subgraph are associated via one or more other vertices, i.e., any two objects (any two first objects, any two second objects, or any pair of a first object and a second object) in the candidate group are either directly associated or indirectly associated via one or more other first objects or second objects in the candidate group.

For example, in a candidate group, two first objects that are connected to the same second object are referred to as directly associated user account numbers, and two first objects that are associated via two or more first object(s) or second object(s) are referred to as indirectly associated user account numbers. For example, for user account number A and user account number B, if a series of user account numbers X1, X2, . . . , Xn (n>=1) can be found, such that A and X1 are directly associated, Xi and Xi+1 (1<=i<=n−1) are directly associated, Xn and B are directly associated, and A and B are not connected to a same second object, then A and B are still indirectly associated user account numbers. Using the connected subgraph technique to find candidate groups not only identifies user account numbers having direct associations, but also identifies multiple account numbers that have indirect associations.

Figure 6:
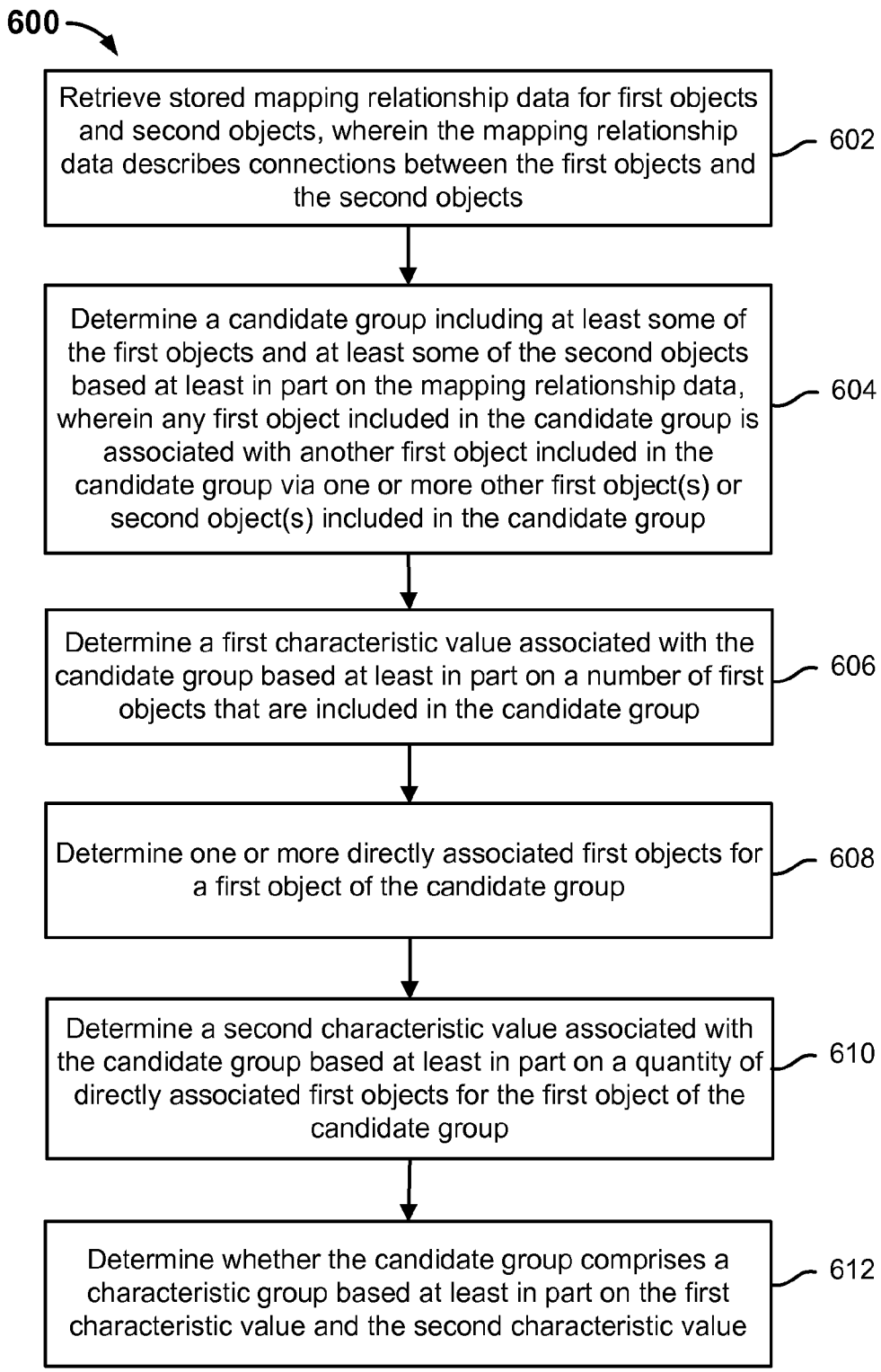
FIG. 6 is a flow diagram showing an embodiment of a process for determining a characteristic group.

FIG. 6 is a flow diagram showing an embodiment of a process for determining a characteristic group. In some embodiments, process 600 is implemented at system 100 of FIG. 1.

Process 600 shows a technique of determining whether a candidate group comprises a characteristic group based on criteria slightly different from the example described with process 200 of FIG. 2. Whereas in the example described above with process 200 of FIG. 2, the determination of whether a candidate group comprises a characteristic group is based on only one characteristic value associated with the candidate group, in the example of process 600, the determination of whether a candidate group comprises a characteristic group is based on both the first characteristic value and a second characteristic value associated with the candidate group.

At 602, stored mapping relationship data for first objects and second objects is retrieved, wherein the mapping relationship data describes connections between the first objects and the second objects. In various embodiments, step 602 may be performed in a manner similar to step 202 of process 200 of FIG. 2.

At 604, a candidate group including at least some of the first objects and at least some of the second objects is determined based at least in part on the mapping relationship data, wherein any first object included in the candidate group is associated with another first object included in the candidate group via one or more other first object(s) or second object(s) included in the candidate group. In various embodiments, step 604 may be performed in a manner similar to step 204 of process 200 of FIG. 2.

At 606, a first characteristic value associated with the candidate group is determined based at least in part on a number of first objects that are included in the candidate group. In various embodiments, step 606 may be performed in a manner similar to step 206 of process 200 of FIG. 2. As described for 206, the first characteristic value comprises the number of first objects that are included in the candidate group.

At 608, one or more directly associated first objects for a first object of the candidate group are determined. Returning to FIG. 4, it is shown that first object A1 and first object A3 are each connected to second object B2 in the candidate group. Because first object A1 and first object A3 are each connected to second object B2, first object A1 is a directly associated first object of first object A3 and similarly, first object A3 is a directly associated first object of first object A1. For example, a first object and one of its directly associated first objects may comprise two user account numbers that share the same user identifier.

Directly associated first objects may be determined for each first object in the candidate group in any appropriate manner. One example of determining a candidate group is described with FIG. 7, below.

Based on graph theory, the number of directly associated first objects of the first object is referred to as the degree of the first object.

Returning to FIG. 6, at 610, a second characteristic value associated with the candidate group is determined based at least in part on a quantity of directly associated first objects for the first object of the candidate group.

In various embodiments, the second characteristic value of a candidate group is the group density in graph theory. For a particular candidate group, the first characteristic value, the number of first objects (e.g., user account numbers) in the candidate group, is used as the value of n, and the second characteristic value of the candidate group is the result of adding together the degrees (the number of directly associated objects) of each first object of the candidate group, then dividing that sum by n(n−1). In some embodiments, the resulting range of values for the group density (the second characteristic value) of the candidate group is between 0-1.

At 612, it is determined whether the candidate group comprises a characteristic group based at least in part on the first characteristic value and the second characteristic value.

Whether the candidate group comprises a characteristic group is determined based at least in part on its first characteristic value and second characteristic value. In some embodiments, in the event that the first characteristic value is greater than a first threshold value, and the second characteristic value is also greater than a second threshold value, then the candidate group is a characteristic group.

This differs from the example described with process 200 of FIG. 2 because in process 200, only the first characteristic value was used to determine whether a candidate group is a characteristic group, while in process 600, the second characteristic value was used in addition to the first characteristic value to determine whether the candidate group is a characteristic group. The additional use of the second characteristic value may serve to improve the accuracy of detecting a candidate group that may include potentially malicious user account numbers. The values assigned to the first threshold value and the second threshold value may be predetermined based on the nature and size of the website and specific criteria for malicious registration actions. For example, the first threshold value and/or the second threshold value may be changed over time. For example, the value assigned to the first threshold value can be from the hundreds to the thousands, and the value assigned to the second threshold value can be between 0.7 and 0.9.

Figure 7:
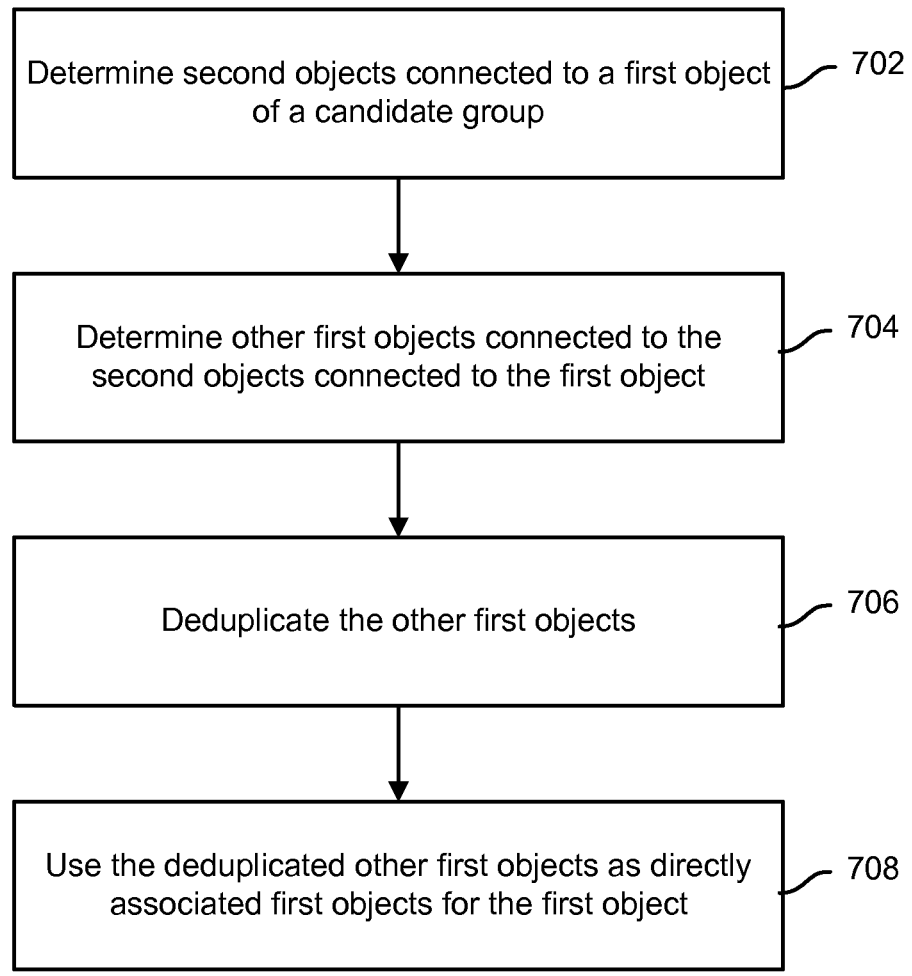
FIG. 7 is a flow diagram showing an embodiment of a process for determining directly associated first objects for a first object.

FIG. 7 is a flow diagram showing an embodiment of a process for determining directly associated first objects for a first object. In some embodiments, process 700 is implemented at system 100 of FIG. 1.

Process 700 shows an example process of determining the directly associated first objects for a first object in a candidate group. Process 700 may be repeated for each first object in the candidate group.

At 702, second objects connected to a first object of a candidate group are determined. Each second object that is connected with the first object is determined.

At 704, other first objects connected to the second objects connected to the first object are determined. Then, each other first object, besides the first object under consideration, which is connected to each second object that is connected with the first object is determined.

At 706, the other first objects are deduplicated. As used herein, deduplication refers to identifying unique first objects. For example, if there are two instances of the same first object in the determined other first objects, then after deduplication, the remaining first objects include only one instance of each first object.

At 708, the deduplicated other first objects are used as directly associated first objects for the first object.

For example, for a first object (e.g., user account number), those second objects (e.g., user identifiers) connected to that user account number are found. Then the user account numbers associated with each such user identifier are found.

Figure 8:
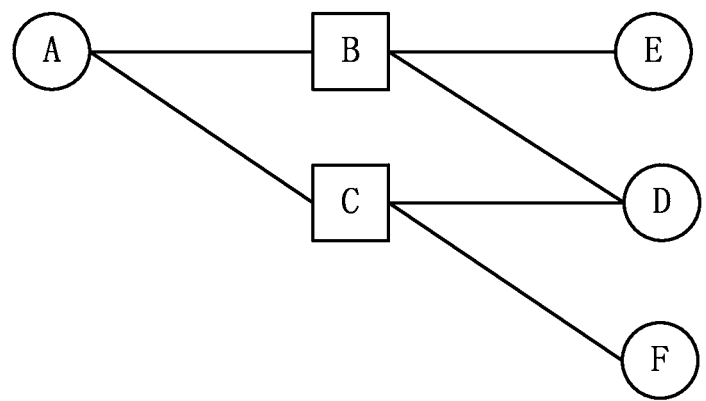
FIG. 8 is a schematic diagram that shows the relationships among several first objects and second objects of a candidate group.

All user account numbers associated with the user identifiers are merged and deduplicated to obtain the directly associated first objects of the first object. FIG. 8 is a schematic diagram that shows the relationships among several first objects and second objects of a candidate group. As shown in the example, user account number A (a first object) is connected with user identifier B and user identifier C. User identifier B is connected with user account number D and user account number E, and user identifier C is connected with user account number D and user account number F. The user account numbers connected with user identifier B and user identifier C (other than user account number A) are merged to obtain four user account numbers: user account number D, user account number E, user account number D, and user account number F. Deduplication is performed on the four user account numbers to obtain account number D, account number E, and account number F, which are the three directly associated first objects of user account number A.

Figure 9:
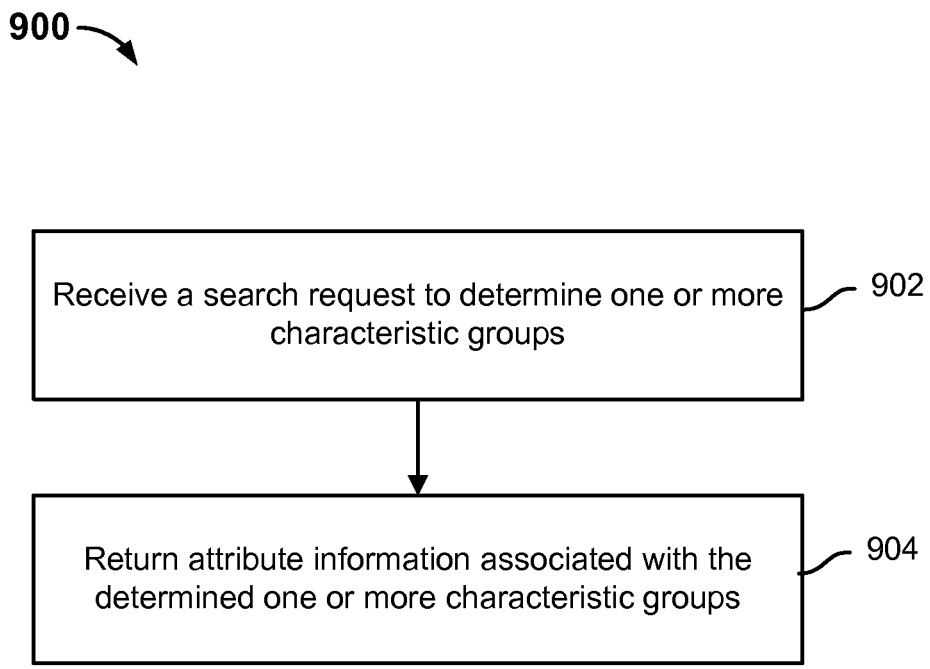
FIG. 9 is a flow diagram showing an embodiment of a process for searching for a characteristic group.

FIG. 9 is a flow diagram showing an embodiment of a process for searching for a characteristic group. In some embodiments, process 900 is implemented at system 100 of FIG. 1.

At 902, a search request to determine one or more characteristic groups is received.

In some embodiments, in response to receipt of the search request to determine one or more characteristic groups, stored mapping relationship data is retrieved and used to determine one or more characteristic groups. The user may submit the request via a user interface associated with a website. For example, process 200 of FIG. 2 or process 600 of FIG. 6 may be used to determine a characteristic group. In some embodiments, the search request may specify a time period associated with the mapping relationship data that should be used to determine the characteristic groups. For example, based on analyzing the mapping relationship data, one or more characteristic groups may be determined. Each characteristic group includes one or more user account numbers that are potentially maliciously registered accounts.

At 904, attribute information associated with the determined one or more characteristic groups is returned.

In some embodiments, information associated with each determined characteristic group may be returned and displayed for the searching user. For example, the returned information may include a list of user account numbers and a list of user identifiers associated with each characteristic group. In some embodiments, for each characteristic group, a further search may be performed to retrieve attribute information (e.g., logon times, reputation values, transaction history data) associated with each user account number and/or each user identifier that is associated with the characteristic group. Such attribute information is returned and displayed over the user interface.

For example, a system administrator associated with a website may submit a search request to determine characteristic groups and then receive information on the determined characteristic groups. The system administrator may review the returned information to determine whether to take further action with respect to a characteristic group. Examples of further actions may include preventing further access to the website by any one or more of the user account numbers that are included in a characteristic group or preventing a new user account associated with any user identifiers included in the characteristic group to be registered at the e-commerce website.

Figure 10:
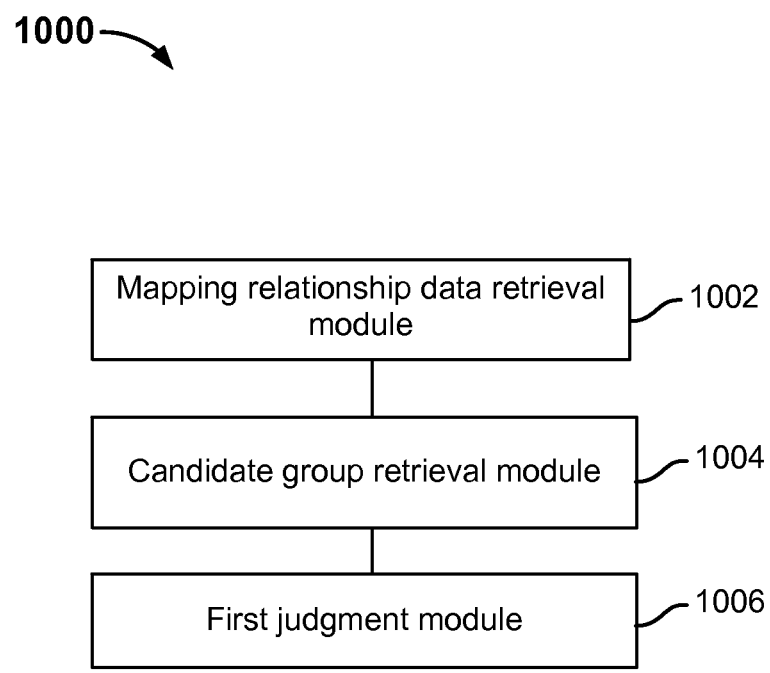
FIG. 10 is a diagram showing an embodiment of a system for determining a characteristic group.

FIG. 10 is a diagram showing an embodiment of a system for determining a characteristic group. In the example, system 1000 includes mapping relationship data retrieval module 1002, candidate group retrieval module 1004, and first judgment module 1006.

The modules, sub-modules, and sub-units can be implemented as software components executing on one or more processors, as hardware such as programmable logic devices and/or Application Specific Integrated Circuits designed to elements can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules, sub-modules, and sub-units may be implemented on a single device or distributed across multiple devices.

Mapping relationship data retrieval module 1002 is configured to retrieve from an initialized database first objects, second objects, and the mapping relationship data between the first objects and second objects. In some embodiments, first objects comprise user account numbers and second objects comprise user identifiers.

Candidate group retrieval module 1004 is configured to determine a candidate group including at least some of the first objects and at least some of the second objects based at least in part on the mapping relationship data.

First judgment module 1006 is configured to determine a first characteristic value associated with the candidate group based at least in part on a number of first objects that are included in the candidate group. First judgment module 1006 is also configured to determine whether the candidate group comprises a characteristic group based at least in part on the first characteristic value.

In some embodiments, the first objects and the second objects may each have an attribute value, and candidate group retrieval module 1004 may further include the following:

An attribute value updating sub-module that is configured to update the corresponding attribute values of each first object or second object, based on the attribute values corresponding to the respectively connected first objects and connected second objects.

A candidate group formation sub-module that is configured to form candidate groups based on first objects and second objects having the same attribute values.

In some embodiments, the attribute value updating sub-module may further include the following:

Sub-unit 1, which is configured to determine second objects connected with each first object and first objects connected with each second object.

Sub-unit 2, which is configured to determine the attribute values corresponding to the connected second objects or the connected first objects.

Sub-unit 3, which is configured to select a first attribute value of the attribute values corresponding to the second objects connected with the first object to use as a correction value of the first object and to select a second attribute value of the attribute values corresponding to the first objects connected with the second object to use as a correction value of the second object.

Sub-unit 4, which is configured to determine whether an attribute value of the first object corresponds to the correction value for the first object or whether an attribute value of the second object corresponds to the correction value of the second object. In the event that the attribute value of the first object does not correspond to the correction value for the first object, the attribute value for the first object is updated to comprise the correction value for the first object and a message is sent to activate sub-unit 1, sub-unit 2, and sub-unit 3 for at least each of the first objects whose attribute values did not correspond to their respective correction values. In the event that the attribute value of the second object does not correspond to the correction value for the second object, the attribute value for the second object is updated to comprise the correction value for the second object and a message is sent to activate sub-unit 1, sub-unit 2, and sub-unit 3 for at least each of the second objects whose attribute values did not correspond to their respective correction values.

In some embodiments, first judgment module 1006 may further include the following:

A first characteristic value judgment sub-module, which is configured to determine that in the event the first characteristic value is greater than a first threshold value, the candidate group comprises a characteristic group.

Figure 11:
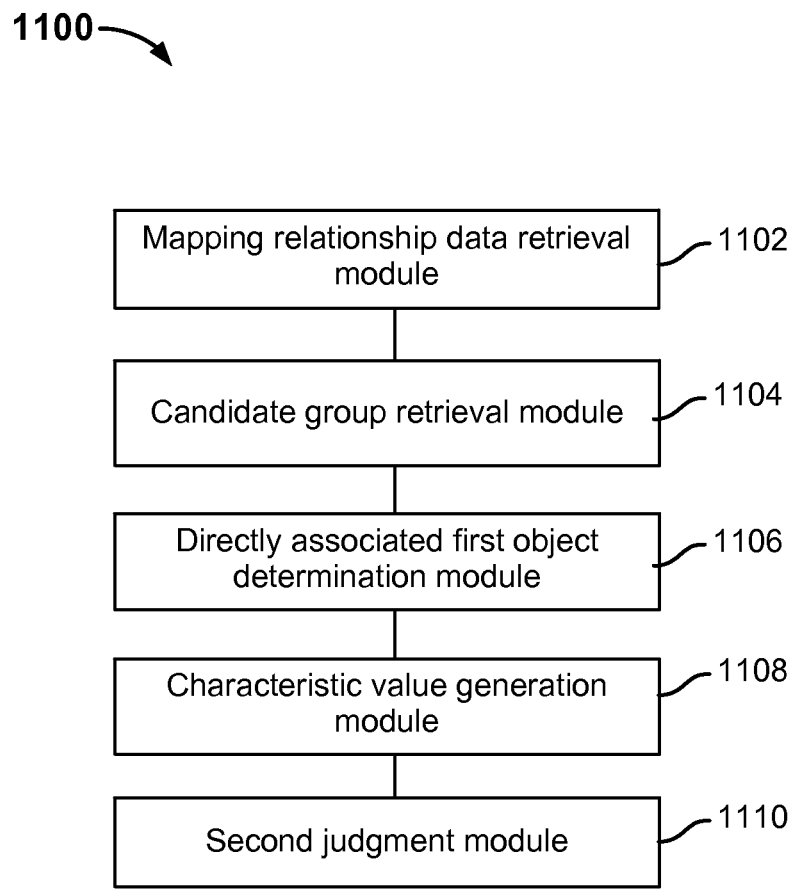
FIG. 11 is a diagram showing an embodiment of a system for determining a characteristic group.

FIG. 11 is a diagram showing an embodiment of a system for determining a characteristic group. In the example, system 1100 includes: mapping relationship data retrieval module 1102, candidate group retrieval module 1104, directly associated first object determination module 1106, characteristic value generation module 1108, and second judgment module 1110.

Mapping relationship data retrieval module 1102 is configured to retrieve from an initialized database first objects, second objects, and the mapping relationship data between the first objects and second objects.

Candidate group retrieval module 1104 is configured to determine a candidate group including at least some of the first objects and at least some of the second objects based at least in part on the mapping relationship data.

Directly associated first object determination module 1106 is configured to determine one or more directly associated first objects for each first object of the candidate group.

Characteristic value generation module 1108 is configured to determine a second characteristic value associated with the candidate group based at least in part on a number of directly associated first objects for each first object of the candidate group.

Second judgment module 1110 is configured to determine a first characteristic value and a second characteristic value associated with the candidate group. Second judgment module 1110 is also configured to determine whether the candidate group comprises a characteristic group based at least in part on the first characteristic value and the second characteristic value.

In some embodiments, directly associated first object determination module 1106 is further includes the following:

A first object determination sub-module, which is configured to determine second objects connected to a first object of a candidate group.

A merge sub-module, which is configured to merge and deduplicate all other first objects connected to the second objects connected to the first object, and use the deduplicated other first objects as the directly associated first objects for the first object.

In some embodiments, the first characteristic value may be recorded as n, and the second characteristic value may be the result of summing the number of directly associated first objects for each first object, then dividing the sum by n(n−1).

In some embodiments, second judgment module 1110 may further include the following:

A second characteristic value judgment sub-module, which is configured to determine that the candidate group comprises a characteristic group based at least in part on the first characteristic value being greater than a first threshold value and the second characteristic value being greater than a second threshold value.

Figure 12:
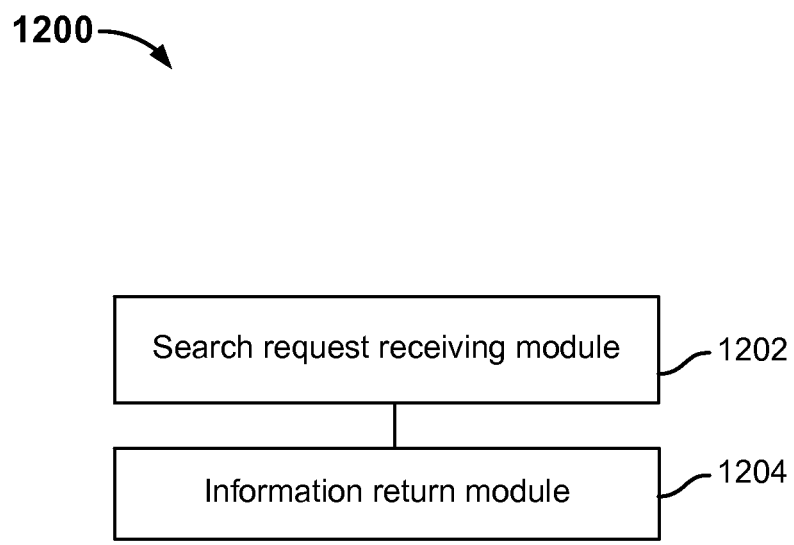
FIG. 12 is a diagram showing an embodiment of a system for searching for characteristic groups.

FIG. 12 is a diagram showing an embodiment of a system for searching for characteristic groups. In the example, system 1200 includes: search request receiving module 1202 and information return module 1204.

Search request receiving module 1202 is configured to receive a search request to determine one or more characteristic groups.

Information return module 1204 is configured to return attribute information associated with the determined one or more characteristic groups.

The present application can be used in many general purpose or specialized computer system environments or configurations. For example: personal computers, servers, handheld devices or portable equipment, tablet type equipment, multiprocessor systems, microprocessor-based systems, set-top boxes, programmable consumer electronic equipment, networked PCs, minicomputers, mainframe computers, distributed computing environments that include any of the systems or equipment above, and so forth.

The present application can be described in the general context of computer executable commands executed by a computer, such as a program module. Generally, program modules include routines, programs, objects, components, data structures, etc. to execute specific tasks or achieve specific abstract data types. The present application can also be carried out in distributed computing environments; in such distributed computing environments, tasks are executed by remote processing equipment connected via communication networks. In distributed computing environments, program modules can be located on storage media at local or remote computers that include storage equipment.

This document has employed specific embodiments to expound the principles and forms of implementation of the present application. The above embodiment descriptions are only meant to aid in comprehension of the methods of the present application and of its core concepts. Moreover, a person with general skill in the art would, on the basis of the concepts of the present application, be able to make modifications to specific implementations and to the scope of applications. To summarize the above, the contents of this description should not be understood as limiting the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more processors of a characteristic group determination server configured to:
retrieve stored mapping relationship data for first objects and second objects, wherein the mapping relationship data describes connections associated with the first objects and the second objects, wherein the first objects comprise user account numbers associated with a website that is provided by a web server, wherein the second objects comprise user identifiers associated with the website, wherein a connection is between one first object and one second object, wherein the mapping relationship data is determined based at least in part on recorded user actions logs associated with user actions that were performed at the website provided by the web server, wherein the recorded user action logs are obtained from the web server;
determine a candidate group including at least some of the first objects and at least some of the second objects based at least in part on the mapping relationship data, wherein any first object included in the candidate group is associated with another first object included in the candidate group directly via a connection from that first object to a first intermediate second object included in the candidate group or indirectly via at least a connection from that first object to a second intermediate second object included in the candidate group and a connection from the second intermediate second object to a first intermediate first object;
determine a first characteristic value associated with the candidate group based at least in part on a number of first objects that are included in the candidate group;
determine whether the candidate group comprises a characteristic group based at least in part on the first characteristic value, wherein the characteristic group is suspected of including at least one malicious first object; and
in the event that the candidate group comprises the characteristic group, prevent access to the website provided by the web server by a user associated with a first object that is included in the characteristic group; and
one or more memories coupled to the one or more processors and configured to provide the one or more processors with instructions.

2. The system of claim 1, wherein the mapping relationship data is determined based at least in part on stored user action logs associated with a website.

3. The system of claim 1, wherein to determine the candidate group includes to:
determine second objects connected with each first object or determine first objects connected with each second object;
obtain attribute values corresponding to the second objects connected with each first object or obtain attribute values corresponding to the first objects connected with each second object;
select a first attribute value of the attribute values corresponding to the second objects connected with a given first object to use as a correction value for the given first object or select a second attribute value of the attribute values corresponding to the first objects connected with a given second object to use as a correction value for the given second object; and
determine whether an attribute value of the given first object corresponds to the correction value for the given first object or determine whether an attribute value of the given second object corresponds to the correction value of the given second object,
in the event the attribute value for the given first object does not correspond to the correction value for the given first object, update the attribute value for the given first object to comprise the correction value for the given first object, and
in the event the attribute value for the given second object does not correspond to the correction value for the given second object, update the attribute value for the given second object to comprise the correction value for the given second object.

4. The system of claim 3, wherein the one or more processors are further configured to include in the candidate group one or more first objects and one or more second objects based at least in part on attribute values corresponding to the one or more first objects and the one or more second objects.

5. The system of claim 1, wherein the candidate group comprises the characteristic group in the event that the first characteristic value is greater than a first threshold value.

6. The system of claim 1, wherein the one or more processors are further configured to determine one or more directly associated first objects for a given first object of the candidate group.

7. The system of claim 6, wherein to determine the one or more directly associated first objects includes to:
determine second objects connected to the given first object of the candidate group;
determine other first objects connected to the second objects connected to the given first object;
deduplicate the other first objects; and
use the deduplicated other first objects as the directly associated first objects for the given first object.

8. The system of claim 6, wherein the one or more processors are further configured to determine a second characteristic value based at least in part on the one or more directly associated first objects determined for the given first object of the candidate group.

9. The system of claim 8, wherein the determination of whether the candidate group comprises the characteristic group is based at least in part on the first characteristic value and the second characteristic value.

10. The system of claim 9, wherein the candidate group comprises the characteristic group in the event that the first characteristic value is greater than a first threshold value and the second characteristic value is greater than a second threshold value.

11. A method, comprising:
retrieving, using one or more processors of a characteristic group determination server stored mapping relationship data for first objects and second objects, wherein the mapping relationship data describes connections associated with the first objects and the second objects, wherein the first objects comprise user account numbers associated with a website that is provided by a web server, wherein the second objects comprise user identifiers associated with the website, wherein a connection is between one first object and one second object, wherein the mapping relationship data is determined based at least in part on recorded user actions logs associated with user actions that were performed at the website provided by the web server, wherein the recorded user action logs are obtained from the web server;
determining a candidate group including at least some of the first objects and at least some of the second objects based at least in part on the mapping relationship data, wherein any first object included in the candidate group is associated with another first object included in the candidate group directly via a connection from that first object to a first intermediate second object included in the candidate group or indirectly via at least a connection from that first object to a second intermediate second object included in the candidate group and a connection from the second intermediate second object to a first intermediate first object;

determining a first characteristic value associated with the candidate group based at least in part on a number of first objects that are included in the candidate group;

determining whether the candidate group comprises a characteristic group based at least in part on the first characteristic value, wherein the characteristic group is suspected of including at least one malicious first object; and in the event that the candidate group comprises the characteristic group, preventing access to the website provided by the web server by a user associated with a first object that is included in the characteristic group.

12. The method of claim 11, wherein determining the candidate group includes:

determining second objects connected with each first object or determining first objects connected with each second object;

obtaining attribute values corresponding to the second objects connected with each first object or obtaining attribute values corresponding to the first objects connected with each second object;

selecting a first attribute value of the attribute values corresponding to the second objects connected with a given first object to use as a correction value for the given first object or selecting a second attribute value of the attribute values corresponding to the first objects connected with a given second object to use as a correction value for the given second object; and determining whether an attribute value of the given first object corresponds to the correction value for the given first object or determining whether an attribute value of the given second object corresponds to the correction value of the given second object, in the event the attribute value for the given first object does not correspond to the correction value for the given first object, updating the attribute value for the given first object to comprise the correction value for the given first object, and in the event the attribute value for the given second object does not correspond to the correction value for the given second object, updating the attribute value for the given second object to comprise the correction value for the given second object.

13. The method of claim 12, further comprising including in the candidate group one or more first objects and one or more second objects based at least in part on attribute values corresponding to the one or more first objects and the one or more second objects.

14. The method of claim 11, wherein the candidate group comprises the characteristic group in the event that the first characteristic value is greater than a first threshold value.

15. The method of claim 11, further comprising determining one or more directly associated first objects for a given first object of the candidate group.

16. The method of claim 15, wherein determining the one or more directly associated first objects includes:

determining second objects connected to the given first object of the candidate group;

determining other first objects connected to the second objects connected to the given first object;

deduplicating the other first objects; and using the deduplicated other first objects as the directly associated first objects for the given first object.

17. The method of claim 15, further comprising determining a second characteristic value based at least in part on the one or more directly associated first objects determined for the given first object of the candidate group.

18. The method of claim 17, wherein the determination of whether the candidate group comprises the characteristic group is based at least in part on the first characteristic value and the second characteristic value.

19. The method of claim 18, wherein the candidate group comprises the characteristic group in the event that the first characteristic value is greater than a first threshold value and the second characteristic value is greater than a second threshold value.

20. A computer program product, the computer program product being embodied in a non-transitory computer readable storage medium and comprising computer instructions for:

retrieving, using one or more processors of a characteristic group determination server, stored mapping relationship data for first objects and second objects, wherein the mapping relationship data describes connections associated with the first objects and the second objects, wherein the first objects comprise user account numbers associated with a website that is provided by a web server, wherein the second objects comprise user identifiers associated with the website, wherein a connection is between one first object and one second object, wherein the mapping relationship data is determined based at least in part on recorded user actions logs associated with user actions that were performed at the website provided by the web server, wherein the recorded user action logs are obtained from the web server;

determining a candidate group including at least some of the first objects and at least some of the second objects based at least in part on the mapping relationship data, wherein any first object included in the candidate group is associated with another first object included in the candidate group directly via a connection from that first object to a first intermediate second object included in the candidate group or indirectly via at least a connection from that first object to a second intermediate second object included in the candidate group and a connection from the second intermediate second object to a first intermediate first object;

determining a first characteristic value associated with the candidate group based at least in part on a number of first objects that are included in the candidate group;

determining whether the candidate group comprises a characteristic group based at least in part on the first characteristic value, wherein the characteristic group is suspected of including at least one malicious first object; and in the event that the candidate group comprises the characteristic group, preventing access to the website provided by the web server by a user associated with a first object that is included in the characteristic group.

21. The system of claim 1, wherein the second objects comprise user identifiers associated with the website comprises one or more of: a cookie generated upon login to the website, an email address, and a phone number.

22. The method of claim 11, wherein the second objects comprise user identifiers associated with the website comprises one or more of: a cookie generated upon login to the website, an email address, and a phone number.

23. The computer program product of claim 20, wherein the second objects comprise user identifiers associated with the website comprises one or more of: a cookie generated upon login to the website, an email address, and a phone number.

\* \* \* \* \*

UNITED STATES PATENT AND TRADEMARK OFFICE
CERTIFICATE OF CORRECTION

PATENT NO. : 9,785,989 B2
APPLICATION NO. : 14/056867
DATED : October 10, 2017
INVENTOR(S) : Zhiqiang Chen et al.

Page 1 of 1

It is certified that error appears in the above-identified patent and that said Letters Patent is hereby corrected as shown below:

In the Claims

In Column 18, Line 40, after "server", insert --,--.

Signed and Sealed this
Twentieth Day of February, 2018

Andrei Iancu
*Director of the United States Patent and Trademark Office*